United States Patent
Bostick et al.

(10) Patent No.: US 10,282,165 B2
(45) Date of Patent: May 7, 2019

(54) SELECTIVE DISPLAYING OF PUSH NOTIFICATIONS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 15/091,680

(22) Filed: Apr. 6, 2016

(65) Prior Publication Data
US 2017/0293466 A1    Oct. 12, 2017

(51) Int. Cl.
| | | |
|---|---|---|
| *G10L 15/10* | (2006.01) | |
| *G06F 3/16* | (2006.01) | |
| *H04L 29/08* | (2006.01) | |
| *G10L 15/26* | (2006.01) | |
| *G10L 15/22* | (2006.01) | |
| *G10L 15/08* | (2006.01) | |

(52) U.S. Cl.
CPC .............. *G06F 3/167* (2013.01); *G10L 15/10* (2013.01); *G10L 15/22* (2013.01); *G10L 15/265* (2013.01); *H04L 67/26* (2013.01); *G10L 2015/088* (2013.01); *G10L 2015/221* (2013.01); *G10L 2015/223* (2013.01)

(58) Field of Classification Search
CPC ........ G06F 3/167; G10L 15/10; G10L 15/265
USPC ....................................................... 704/253
See application file for complete search history.

(56) References Cited

U.S. PATENT DOCUMENTS

| | | | |
|---|---|---|---|
| 2004/0215732 A1 | 10/2004 | McKee et al. | |
| 2005/0216269 A1* | 9/2005 | Scahill | G06F 17/30663 |
| | | | 704/270.1 |
| 2006/0095529 A1 | 5/2006 | McNamara et al. | |
| 2006/0235885 A1 | 10/2006 | Steele et al. | |
| 2007/0214245 A1 | 9/2007 | Hamalainen et al. | |
| 2011/0029670 A1 | 2/2011 | Klein et al. | |

(Continued)

FOREIGN PATENT DOCUMENTS

| | | |
|---|---|---|
| EP | 2924946 A1 | 9/2015 |
| WO | 2013138344 A1 | 9/2013 |

(Continued)

OTHER PUBLICATIONS

Mehrotra et al., "Designing Content-driven Intelligent Notification Mechanisms for Mobile Applications", UbiComp 15, Sep. 7-11, 2015, pp. 813-824, Osaka, Japan.

(Continued)

*Primary Examiner* — Richemond Dorvil
*Assistant Examiner* — Rodrigo A Chavez
(74) *Attorney, Agent, or Firm* — Stephanie L. Carusillo (57) ABSTRACT

In an approach for selectively displaying a push notification, audio is captured using a microphone. A processor receives a push notification, wherein the push notification includes information. A processor identifies a keyword associated with the push notification based on the information. A processor determines that the captured audio includes the keyword. A processor determines whether to display the push notification based on the determination of whether the captured audio includes the keyword.

20 Claims, 4 Drawing Sheets

(56) References Cited

U.S. PATENT DOCUMENTS

| | | | |
|---|---|---|---|
| 2013/0006769 A1* | 1/2013 | Schalk | G06Q 30/0266 705/14.54 |
| 2014/0195252 A1* | 7/2014 | Gruber | G10L 15/22 704/275 |
| 2014/0258883 A1 | 9/2014 | Duarte et al. | |
| 2014/0282003 A1* | 9/2014 | Gruber | G06F 3/167 715/727 |
| 2014/0373048 A1* | 12/2014 | Mo | G06Q 30/02 725/34 |
| 2015/0195411 A1 | 7/2015 | Krack et al. | |
| 2015/0266377 A1* | 9/2015 | Hampiholi | B60K 35/00 455/466 |
| 2016/0241530 A1* | 8/2016 | Andreev | H04L 51/12 |
| 2017/0085677 A1* | 3/2017 | Babu | H04L 67/36 |

FOREIGN PATENT DOCUMENTS

| | | |
|---|---|---|
| WO | 2014124332 A2 | 8/2014 |
| WO | 2015096637 A1 | 7/2015 |

OTHER PUBLICATIONS

Pielot et al., "An In-Situ Study of Mobile Phone Notifications", MobileHCI '14, Sep. 23-26, 2014, 10 pages, Toronto, ON, Canada, © 2014 ACM.

\* cited by examiner

SELECTIVE DISPLAYING OF PUSH NOTIFICATIONS

BACKGROUND

The present invention relates generally to the field of device push notifications, and more particularly to utilizing passive listening and analytics to decide whether a push notification should be displayed.

A push notification is the delivery of information from an application server to a computing device without a specific request from the device user. The majority of applications today offer the capability to provide push notifications. Computing device users can receive these push notifications on their smart phones, smart watches, tablets, laptops, etc. Typically, when an application is installed, the user is prompted to select whether they would like to allow push notifications to be sent to the computing device. Oftentimes, the user can manage his or her push notification selection in the device's settings. Generally, to receive push notifications, the specific application(s) on a computing device do not need to be open. This may allow a computing device to receive and display push notifications even when the device's screen is locked and the specific application that is associated with the notification is closed.

Passive listening can be used by mobile devices, generally, to listen for commands passively from a user. For example, an application or program passively listens for a trigger word or phrase summoning the application or program to actively listen to the user. After stating the trigger word or phrase, the user will state a command or question for the application or program. The application or program will then analyze the command or question from the user and follow out the command or respond to the question.

SUMMARY

Aspects of an embodiment of the present invention disclose a method, computer program produce, and computer system for selectively displaying a push notification. A processor captures, by a microphone, audio. A processor receives a push notification, wherein the push notification includes information. A processor identifies a keyword associated with the push notification based on the information. A processor determines that the captured audio includes the keyword. A processor determines whether to display the push notification based on the determination of whether the captured audio includes the keyword.

DETAILED DESCRIPTION

Embodiments of the present invention recognize the increasing number of push notifications mobile device users are receiving. In some instances, users receive push notifications with information that they already have been exposed to. For example, a user may receive a push notification with a sports score update. However, the user may currently be watching the game indicated by the push notification. Thus, the user has already been exposed to the information in the push notification and embodiments of the present invention recognize that the push notification is redundant. Embodiments of the present invention provide solutions for determining what information a user has already been exposed to. In this manner, as discussed in greater detail herein, embodiments of the present invention can provide a way to determine if a user has already been exposed to the information in a push notification and then decide whether to display, or otherwise present, the push notification to the user.

The present invention will now be described in detail with reference to the Figures.

Figure 1:
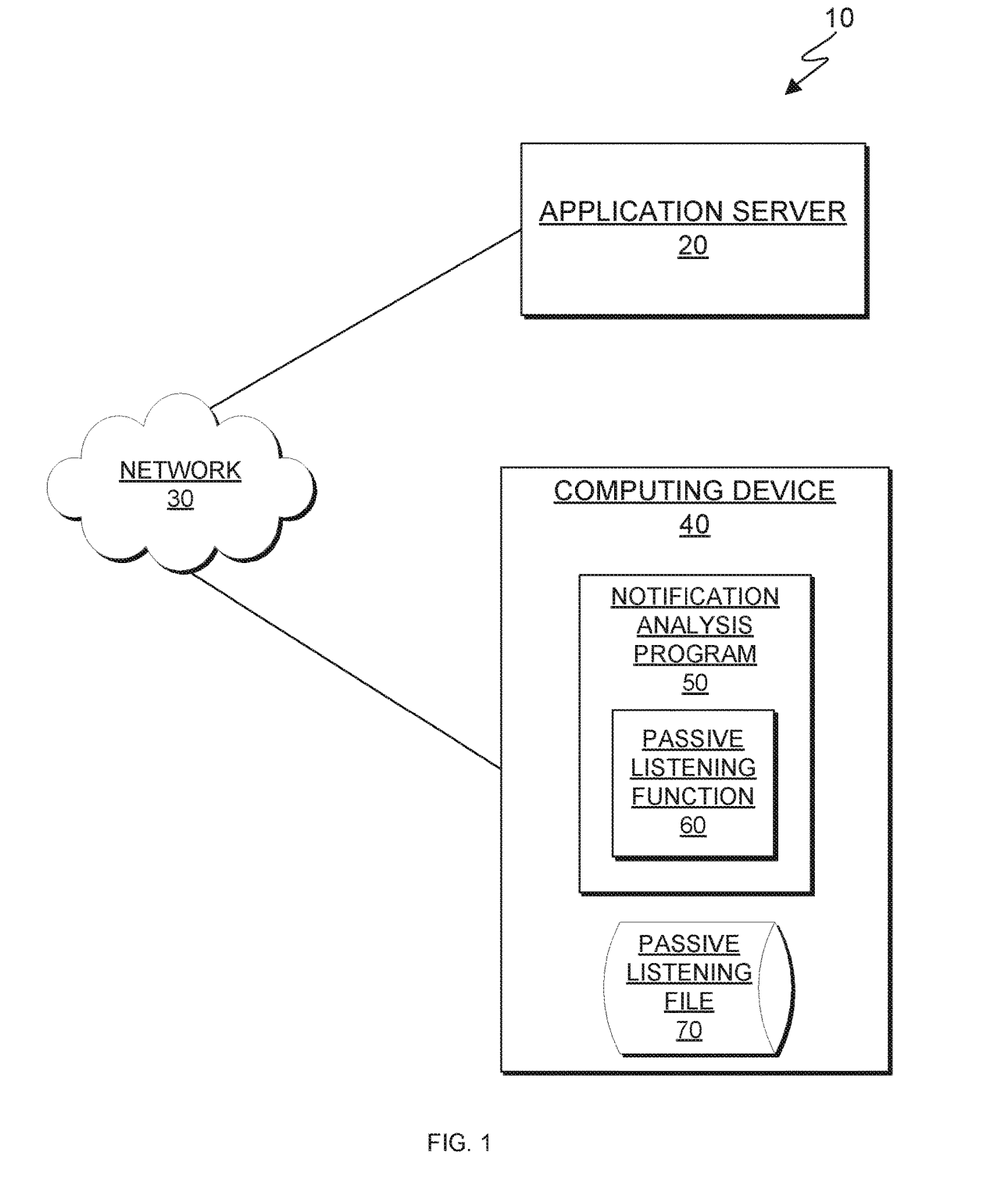
FIG. 1 depicts a diagram of a computing environment, in accordance with an embodiment of the present invention.

FIG. 1 depicts a diagram of computing environment 10, in accordance with an embodiment of the present invention. FIG. 1 provides only an illustration of one embodiment and does not imply any limitations with regard to the environments in which different embodiments may be implemented.

In the depicted embodiment, computing environment 10 includes application server 20 and computing device 40 interconnected over network 30. Network 30 may be a local area network (LAN), a wide area network (WAN) such as the Internet, the public switched telephone network (PSTN), any combination thereof, or any combination of connections and protocols that will support communications between application server 20 and computing device 40, in accordance with embodiments of the invention. Network 30 may include wired, wireless, or fiber optic connections. Computing environment 10 may include additional computing devices, servers, computers, mobile devices, or other devices not shown.

Application server 20 is associated with an application (not shown) stored to computing device 40 and operates to generate and send push notifications to users of the application, based on their preferences. Application server 20 may be a management server, a web server, or any other electronic device or computing system capable of receiving and sending data. In some embodiments, application server 20 may be a laptop computer, tablet computer, netbook computer, personal computer (PC), a desktop computer, a smart phone, or any programmable electronic device capable of communicating with computing device 40 via network 30. In other embodiments, application server 20 may represent a server computing system utilizing multiple computers as a server system, such as in a cloud computing environment. Application server 20 may include components, as depicted and described in further detail with respect to FIG. 4.

Computing device 40 receives push notifications for the application associated with application server 20. Computing device 40 may be a laptop computer, netbook computer, tablet computer, personal digital assistant (PDA), smart watch, smart phone, or cell phone. In general, computing device 40 may be any electronic device or computing system capable of receiving and recording audio with a microphone, sending and receiving data, and communicating with application server 20 over network 30. In the depicted embodiment, computing device 40 contains notification analysis program 50, passive listening function 60, and passive listening file 70. Computing device 40 may include components, as depicted and described in further detail with respect to FIG. 4.

Notification analysis program 50 operates to analyze an incoming push notification sent by application server 20 over network 30 to computing device 40. Notification analysis program 50 will determine whether the push notification should be displayed, or otherwise presented, to a user. Notification analysis program 50 has access to passive listening file 70. In some embodiments, notification analysis program 50 resides on computing device 40. In other embodiments, notification analysis program 50 may reside on another server, or another computing device, provided that notification analysis program 50 has access to location identifying information associated with computing device 40.

Passive listening function 60 operates to capture audio from the surrounding external environmental of computing device 40. In some embodiments, passive listening function 60 continually captures audio. In other embodiments, passive listening function 60 periodically captures audio. In an embodiment, a user may specify in the computing device's settings to only passively listen at certain times. For example, passive listening function 60 can be set to only passively listen between 10:00 am and 6:00 pm. In another embodiment, a user may specify in the computing device's settings to only passively listen during certain events. For example, passive listening function 60 can be set to only passively listen when a football game of a particular team of interest is being played.

In the depicted embodiment, passive listening function 60 utilizes a microphone of computing device 40 to capture audio. Passive listening function 60 has access to passive listening file 70. In an embodiment, passive listening function 60 may write the captured audio in passive listening file 70. In one embodiment, passive listening function 60 extracts text from the audio utilizing speech-to-text processes, and writes the text in passive listening file 70. In some embodiments, passive listening function 60 resides on computing device 40. In other embodiments, passive listening function 60 may reside on another server, or another computing device, provided that passive listening function 60 has access to location identifying information associated with computing device 40.

Passive listening file 70 is a file, cache, or other repository that may be written by passive listening function 60 and read by notification analysis program 50. Audio and/or text captured by passive listening function 60 may be stored to passive listening file 70. In an embodiment, passive listening file 70 may be overwritten after a pre-determined time period by passive listening function 60. For example, a user may specify the period of time that passively listened data should be stored. In another example, the manufacturer of the device, or the developer of an application may specify the time period that passively listened data should be stored. In some embodiments, passive listening file 70 resides on computing device 40. In other embodiments, passive listening file 70 may reside on another server, or another computing device, provided that passive listening file 70 is accessible to notification analysis program 50 and passive listening function 60.

Figure 2:
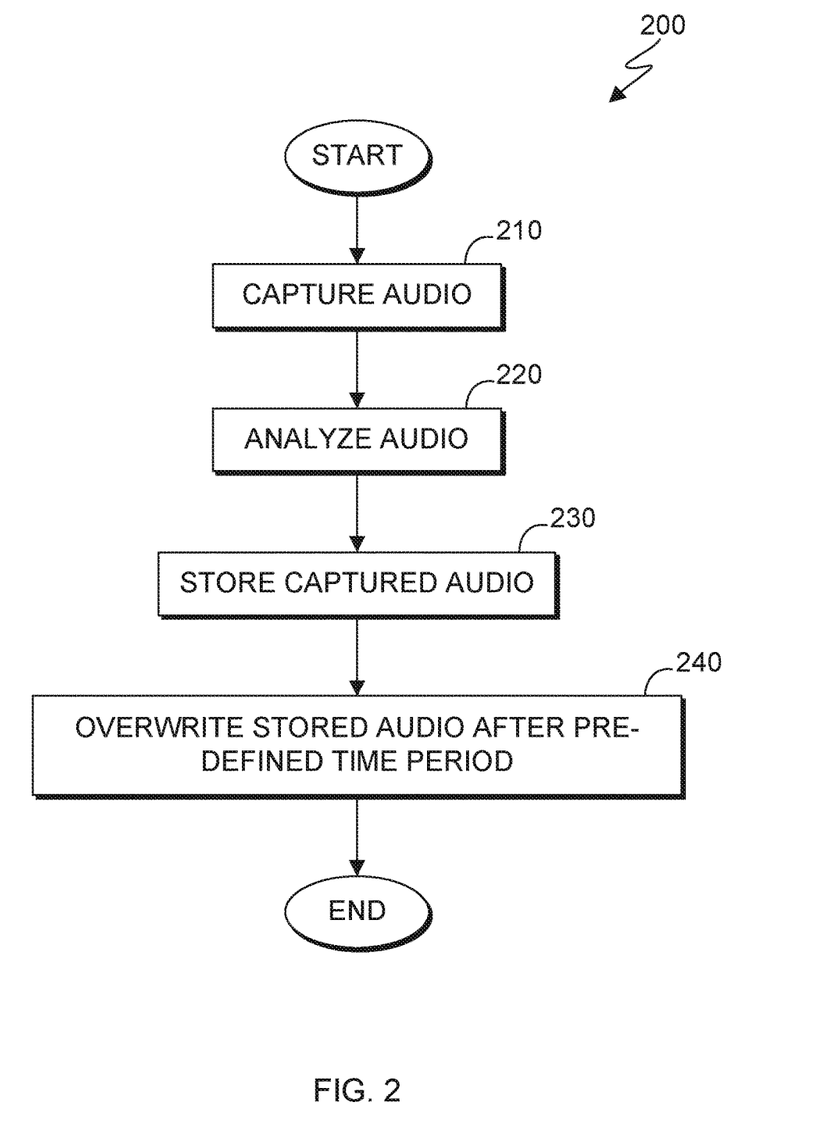
FIG. 2 depicts a flowchart of the steps of a passive listening function executing within the computing environment of FIG. 1, for capturing and storing audio from the surrounding external environment of a computing device, in accordance with an embodiment of the present invention.

FIG. 2 depicts a flowchart 200 of the steps of a passive listening function 60 executing within the computing environment of FIG. 1, in accordance with an embodiment of the present invention. In the depicted embodiment, passive listening function 60 operates to capture audio from the surrounding external environment of computing device 40.

In step 210, passive listening function 60 captures audio. In an embodiment, computing device 40 may include a microphone to allow passive listening function 60 to capture audio. In an embodiment, passive listening function 60 may continuously capture audio. For example, passive listening function 60 may cause a microphone of computing device 40 to remain continuously active, such that audio from the surrounding external environment can be captured. In other embodiments, passive listening function 60 may periodically capture audio. In an embodiment, a user may specify in the computing device's settings to only passively listen at certain times. For example, passive listening function 60 can be set to only passively listen between 10:00 am and 6:00 pm. In another embodiment, a user may specify in the computing device's settings to only passively listen during certain events. For example, passive listening function 60 can be set to only passively listen when a football game is being played.

In step 220, passive listening function 60 may optionally analyze the audio. In an embodiment, passive listening function 60 may use speech recognition techniques, or another type of speech-to-text analysis, to convert the audio into text to be stored in passive listening file 70.

In step 230, passive listening function 60 stores the captured audio. In an embodiment, passive listening function 60 may store the captured audio in passive listening file 70. In another embodiment, passive listening function 60 may store captured audio that has been converted to text in passive listening file 70.

In step 240, passive listening function 60 overwrites the stored audio after a pre-defined time period. In an embodiment, a user may specify in computing device 40 settings the length of time a portion of audio will be in passive listening file 70 before the portion of audio is overwritten. In another embodiment, a developer of passive listening function 60 or notification analysis program 50 may pre-define the length of time audio or text will be in passive listening file 70 before the audio or text is overwritten. In some embodiments, passive listening function 60 will not overwrite any stored audio that has been flagged for further analysis by notification analysis program 50.

Figure 3:
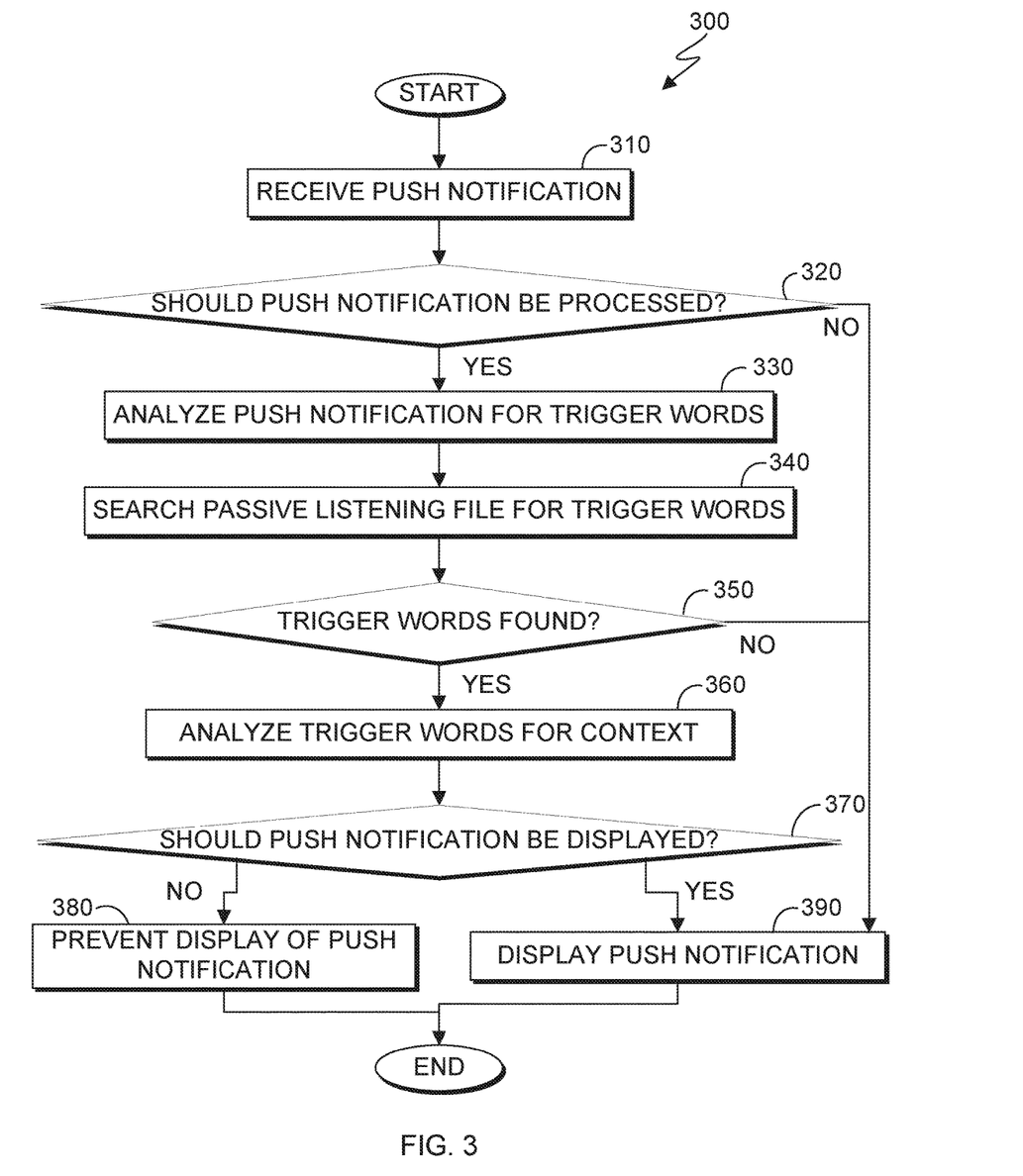
FIG. 3 depicts a flowchart of the steps of a notification analysis program executing within the computing environment of FIG. 1, for analyzing a push notification to determine if the push notification should be displayed to a user, in accordance with an embodiment of the present invention.

FIG. 3 depicts a flowchart of the steps of notification analysis program 50, executing within computing environment of FIG. 1, in accordance with an embodiment of the present invention. In the depicted embodiment, notification analysis program 50 operates to analyze an incoming push notification sent by application server 20 to computing device 40 and determine whether the push notification will be displayed, or otherwise presented, to the user.

In step 310, notification analysis program 50 receives a push notification. In an embodiment, notification analysis program 50 may receive the push notification from application server 20. A push notification includes the delivery of information from an application server to a computing device without a specific request from the user. When an application is installed on computing device 40, a user may be prompted to select whether to allow push notifications from the application. Then, computing device 40 can receive push notifications without the user having the application open or requesting the information. In the application's settings, a user may specify what type of push notifications will be allowed. For example, for a sports application, a user may select to receive score updates from a specific football team. Then, the sports application may send the user a push notification containing a score update, without the user having the application open or requesting the information. In another example, for a news application, a user may select to receive breaking news updates only with information about the presidential election. Then, the news application may send the user a push notification containing a breaking news update about the presidential election without the user having the application open or requesting the information.

In decision 320, notification analysis program 50 determines whether the push notification should be processed. In one embodiment, notification analysis program 50 accesses rules defined by a user as to which push notifications should be processed. In an embodiment, a user may individually select which application's push notifications should be processed by notification analysis program 50. For example, a user can select that all push notifications from a certain sports application be processed. In another embodiment, a user may specify that all push notifications with information of a certain type be processed. For example, a user can specify that all push notifications that contain a sports score be processed. In another example, a user can specify that all push notifications that contain information about the presidential election be processed. In another embodiment, a combination of the above two rule types may be used. For example, a user can specify that all push notifications from a certain sports application that contain a sports score be processed. In another example, a user can specify that all push notifications from a certain news application that contain information about the presidential election be processed. If notification analysis program 50 determines that the incoming push notification should not be processed (decision 320, no branch), then notification analysis program 50 causes the push notification to be displayed to the user (see step 390. If notification analysis program 50 determines that the incoming push notification should be processed (decision 320, yes branch), then notification analysis program 50 analyzes the push notification for trigger words (see step 330).

In step 330, notification analysis program 50 analyzes the push notification for trigger words or keywords. Notification analysis program 50 may use several different techniques to extract trigger words from the push notification. In some embodiments, trigger words or keywords may include proper nouns, acronyms, etc. In some embodiments, common words like "a, the, I, etc." might be on a list of words that should generally not be considered trigger words. In an embodiment, notification analysis program 50 may extract trigger words directly from the text in the push notification. For example, if a push notification included the sentence, "John Doe throws a TD to put Football Team A up 21-0," notification analysis program 50 can extract "John Doe" and "Football Team A" as trigger words.

In another embodiment, notification analysis program 50 may extract trigger words from the derived meaning of the text by using natural language processing (e.g., deep linguistic processing, sentence splitting, named entry recognition, tokenization, word sense disambiguation, chunking, parsing, and topic segmentation, etc.) to process the semantics of the push notification. In one embodiment, notification analysis program 50 uses text analytics to parse through the push notification. Using natural language processing and at least one set of dictionaries and rules, notification analysis program 50 may perform text analytics on the push notification. Text analytics can be performed using an Unstructured Information Management Architecture (UIMA) application configured to analyze unstructured information to discover patterns relevant to notification analysis program 50 by processing plain text and identifying trigger words. For example, notification analysis program 50 can use natural language processing to extract the word "TD" from the push notification and know that this stands for "touchdown."

In another embodiment, notification analysis program 50 may use associated content from an external resource or third party service to help understand the information in the push notification. The external resource or third party service may be the closed captions for a broadcast or an associated online resource. In an embodiment, the push notification may indicate an associated broadcast or online resource. For example, a sports application associated with the push notification including a score update may indicate that there is an associated broadcast of the football game and notification analysis program 50 can analyze the closed captions. In another example, a news application associated with a push notification about the presidential election may indicate that there is an associated news article or news broadcast and notification analysis program 50 can analyze the article or closed captions. In one embodiment, notification analysis program 50 uses text analytics to parse through the associated content. Using natural language processing and at least one set of dictionaries and rules, notification analysis program 50 may perform text analytics on the associated content. Text analytics can be performed using an UIMA application configured to analyze unstructured information to discover patterns relevant to notification analysis program 50 by processing plain text and identifying trigger words. For example, if a push notification includes the text, "Football Team A scores TD", notification analysis program 50 can use natural language processing to extract additional trigger words from the closed captions of the football game broadcast, such as what player scored the touchdown. Notification analysis program 50 will generate a list of identified trigger words.

In step 340, notification analysis program 50 searches passive listening file 70 for the identified trigger words. In an embodiment, notification analysis program 50 may use voice recognition technology to search the audio in passive listening file 70 for the identified trigger words. In one embodiment, passive listening function 60 may initially convert audio to text (see FIG. 2, step 220), and notification analysis program 50 may search the stored text for the identified trigger words.

In decision 350, notification analysis program 50 determines if any of the identified trigger words from the push notification are found in passive listening file 70. Notification analysis program 50 may determine whether any of the identified trigger words from the push notification are found in passive listening file 70 based on the results of the search (see step 340). If notification analysis program 50 determines that no trigger words are found, then notification analysis program 50 causes the push notification on computing device 40 (see step 390). If notification analysis program 50 determines that trigger words are found, notification analysis program 50 continues onto step 360. In an embodiment, notification analysis program 50 may flag identified portions of the audio in passive listening file 70 when an identified trigger word is found to prevent the audio from being overwritten by passive listening function 60. For example, in such an embodiment, if "Football Team A" is an identified trigger word and is found in a portion of audio in passive listening file 70, then notification analysis program 50 will flag that portion of audio for further analysis and prevent passive listening function 60 from overwriting the flagged portion.

In step 360, in some embodiments, notification analysis program 50 analyzes the determined trigger words from the stored audio. In an embodiment, notification analysis program 50 may analyze the determined trigger words for context. In an embodiment, notification analysis program 50 may analyze the wording that occurs both before and after the determined trigger word. In an embodiment, notification analysis program 50 may use natural language processing (e.g., deep linguistic processing, sentence splitting, named entry recognition, tokenization, word sense disambiguation, chunking, parsing, and topic segmentation, etc.) to understand the context in which the trigger word is being used in the stored audio. Using natural language processing and at least one set of dictionaries and rules, notification analysis program 50 may perform text analytics on the stored audio. Text analytics can be performed using an UIMA application configured to analyze unstructured information to discover patterns relevant to notification analysis program 50 by processing plain text and understanding the context of the determined trigger word in the stored audio.

In some embodiments, notification analysis program 50 assigns a confidence level to the determined trigger word. A confidence level expresses the likelihood, based on the analysis of the determined trigger word from the captured audio, that a user has already been exposed to the information in the push notification. A trigger word that is less commonly used or is used in only a few contexts may have a higher confidence level than a trigger word that is more commonly used in many contexts. For example, if "touchdown" and "Denver" are both trigger words, "touchdown" will have a higher confidence level because it is used in fewer contexts than "Denver". A confidence level may be a percentage, score, etc. In an embodiment, if more than one trigger word was determined, notification analysis program 50 may aggregate the confidence levels assigned to each trigger word and determine an overall confidence level.

In decision 370, notification analysis program 50 determines whether the push notification should be displayed. Notification analysis program 50 may determine whether the push notification should be displayed by averaging the assigned confidence levels to each trigger word. In an embodiment, a user may specify the minimum threshold confidence level that must be exceeded before notification analysis program 50 will prevent the push notification from being displayed. If notification analysis program 50 determines the minimum threshold confidence level has not been exceeded, notification analysis program 50 will display the push notification (step 390). If notification analysis program 50 determines the minimum threshold confidence level has been exceeded, notification analysis program 50 will prevent the push notification from being displayed (step 380).

Figure 4:
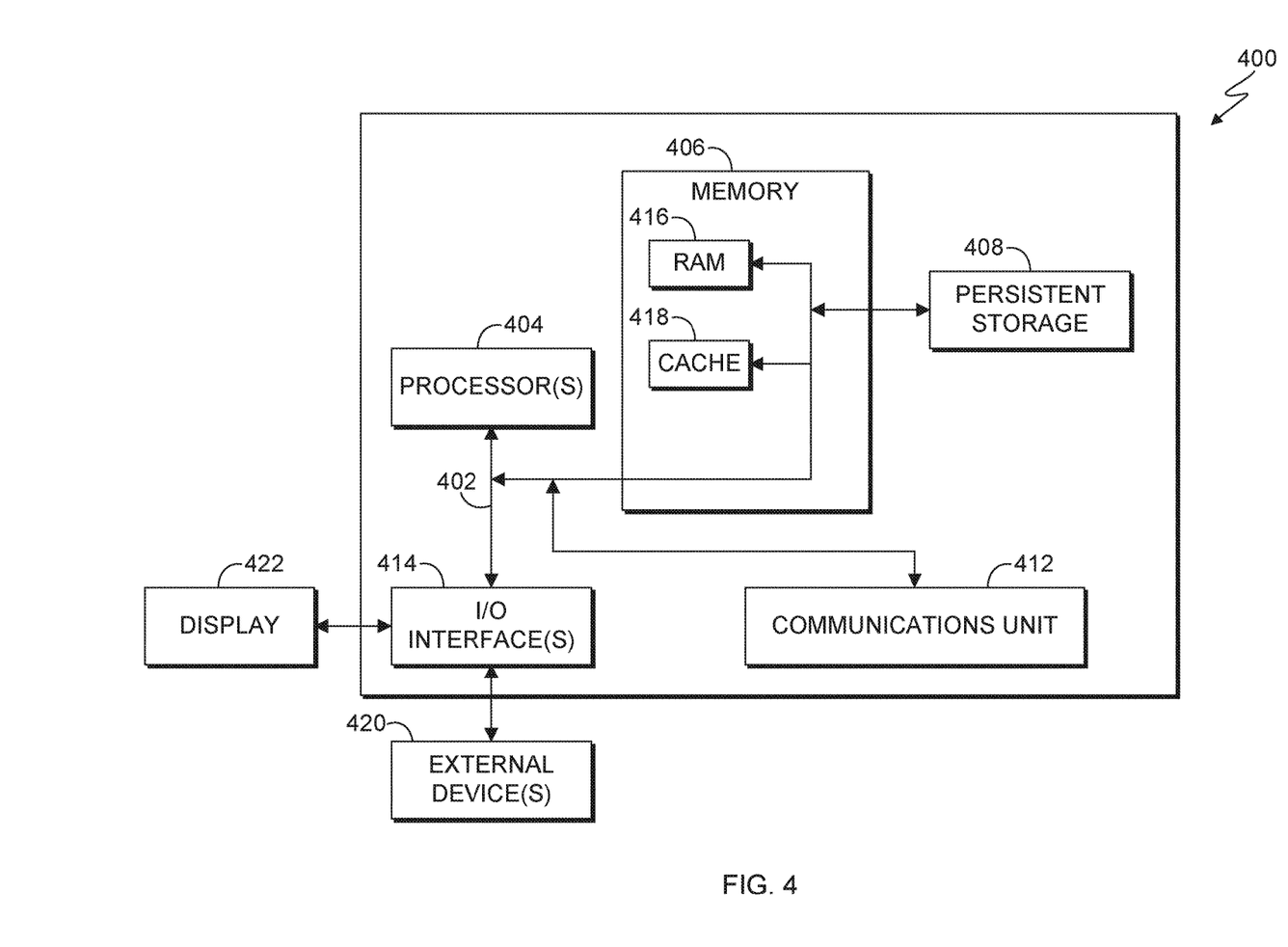
FIG. 4 is a block diagram of internal and external components of the application server and computing environment of FIG. 1, in accordance with an embodiment of the present invention.

FIG. 4 depicts a block diagram 400 of components of application server 20 and computing device 40 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Application server 20 and computing device 40 each include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Notification analysis program 50, passive listening function 60, and passive listening file 70 may be stored in persistent storage 408 of computing device 40 and in memory 406 of computing device 40 for execution and/or access by one or more of the respective computer processors 404 of computing device 40 via cache 416 of computing device 40. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Notification analysis program 50, passive listening function 60, and passive listening file 70 may be downloaded to persistent storage 408 of computing device 40 through communications unit 410 of computing device 40.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., notification analysis program 50, passive listening function 60, and passive listening file 70 can be stored on such portable computer readable storage media and can be loaded onto persistent storage 408 of computing device 40 via I/O interface(s) 412 of computing device 40. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selectively presenting a push notification, the method comprising:

capturing, by a microphone, audio by passively listening to an external environment of a computing device during a pre-determined time period specified by a user of the computing device;

receiving, by the computing device, a push notification, wherein the push notification includes information sent from an application server to the computing device without a specific request by the user of the computing device;

responsive to receiving the push notification, determining, by one or more processors, based on a pre-defined set of rules set by the user, that the push notification is to be processed for a determination of whether the push notification is to be presented on the computing device;

responsive to determining that the push notification is to be processed, determining whether the push notification is to be presented, wherein determining whether the push notification is to be presented comprises:

identifying, by one or more processors, a keyword contained within the push notification, wherein the keyword is identified using associated content from an external source, wherein the associated content from the external source is selected from the group consisting of closed captions for a broadcast and an associated online resource;

responsive to identifying the keyword, determining, by one or more processors, that the captured audio includes the keyword identified within the push notification;

responsive to determining that the captured audio includes the keyword identified within the push notification, analyzing, by one or more processors, a context of the keyword included in the captured audio; and responsive to analyzing the context of the keyword included in the captured audio, determining, by one or more processors, whether to present the push notification based on the context of the keyword included in the captured audio; and responsive to determining not to present the push notification, preventing, by one or more processors, the push notification from being presented on the computing device.

2. The method of claim 1, wherein identifying the keyword associated with the push notification comprises:

determining, by one or more processors, an external resource associated with the information;

analyzing, by one or more processors, the external resource; and extracting, by one or more processors, the keyword based on the analysis of the external resource.

3. The method of claim 1, wherein the captured audio comprises audio captured within a pre-defined period of time prior to receiving the push notification.

4. The method of claim 1, wherein determining that the captured audio includes the keyword comprises:

converting, by one or more processors, the captured audio to text;

searching, by one or more processors, the text for the keyword; and determining, by one or more processors, that the text includes the keyword, based on the search.

5. The method of claim 1, further comprising:

assigning, by one or more processors, a confidence level to the keyword, wherein the confidence level indicates a likelihood that audio containing the keyword correlates to the information of the push notification.

6. The method of claim 5, wherein determining whether to present the push notification based on the context of the keyword included in the captured audio comprises:

determining whether the assigned confidence level exceeds a threshold, wherein the threshold indicates a minimum predefined confidence level needed to determine to prevent the push notification from being presented.

7. The method of claim 1, wherein the pre-determined time period is a sporting event.

8. The method of claim 7, wherein identifying the keyword associated with the push notification comprises:

analyzing, by one or more processors, closed captions for an associated broadcast of the sporting event to help identify the keyword.

9. A computer program product for selectively presenting a push notification, the computer program product comprising:

one or more computer-readable storage media and program instructions stored on the one or more computer-readable storage media wherein the computer readable storage media does not include transitory signals per se, the program instructions comprising:

program instructions to capture, by a microphone, audio by passively listening to an external environment of a computing device during a pre-determined time period specified by a user of the computing device;

program instructions to receive, by the computing device, a push notification, wherein the push notification includes information sent from an application server to the computing device without a specific request by the user of the computing device;

responsive to the program instructions to receive the push notification, program instructions to determine, based on a pre-defined set of rules set by the user, that the push notification is to be processed for a determination of whether the push notification is to be presented on the computing device;

responsive to the program instructions to determine that the push notification is to be processed, program instructions to determine whether the push notification is to be presented, wherein the program instructions to determine whether the push notification is to be presented comprise:

program instructions to identify a keyword contained within the push notification, wherein the keyword is identified using associated content from an external source, wherein the associated content from the external source is selected from the group consisting of closed captions for a broadcast and an associated online resource;

responsive to the program instructions to identify the keyword, program instructions to determine that the captured audio includes the keyword identified within the push notification;

responsive to the program instructions to determine that the captured audio includes the keyword identified within the push notification, program instructions to analyze a context of the keyword included in the captured audio; and responsive to the program instructions to analyze the context of the keyword included in the captured audio, program instructions to determine whether to present the push notification based on the context of the keyword included in the captured audio; and program instructions to, responsive to determining not to present the push notification, prevent the push notification from being presented on the computing device.

10. The computer program product of claim 9, wherein the program instructions to identify the keyword associated with the push notification comprise:

program instructions to determine an external resource associated with the information;
program instructions to analyze the external resource; and
program instructions to extract the keyword based on the analysis of the external resource.

11. The computer program product of claim 9, wherein the captured audio comprises audio captured within a pre-defined period of time prior to the program instructions to receive the push notification.

12. The computer program product of claim 9, wherein the program instructions to determine that the captured audio includes the keyword comprise:

program instructions to convert the captured audio to text;
program instructions to search the text for the keyword; and
program instructions to determine that the text includes the keyword, based on the search.

13. The computer program product of claim 9, further comprising:

program instructions, stored on the one or more computer readable storage media, to assign a confidence level to the keyword, wherein the confidence level indicates a likelihood that audio containing the keyword correlates to the information of the push notification.

14. The computer program product of claim 9, wherein the pre-determined time period is a sporting event.

15. A computer system for selectively presenting a push notification, the computer system comprising:

one or more computer processors;
one or more computer readable storage media;
program instructions stored on the computer readable storage media for execution by at least one of the one or more processors, the program instructions comprising:

program instructions to capture, by a microphone, audio by passively listening to an external environment of a computing device during a pre-determined time period specified by a user of the computing device;

program instructions to receive, by the computing device, a push notification, wherein the push notification includes information sent from an application server to the computing device without a specific request by the user of the computing device;

responsive to the program instructions to receive the push notification, program instructions to determine, based on a pre-defined set of rules set by the user, that the push notification is to be processed for a determination of whether the push notification is to be presented on the computing device;

responsive to the program instructions to determine that the push notification is to be processed, program instructions to determine whether the push notification is to be presented, wherein the program instructions to determine whether the push notification is to be presented comprise:

program instructions to identify a keyword contained within the push notification, wherein the keyword is identified using associated content from an external source, wherein the associated content from the external source is selected from the group consisting of closed captions for a broadcast and an associated online resource;

responsive to the program instructions to identify the keyword, program instructions to determine that the captured audio includes the keyword identified within the push notification;

responsive to the program instructions to determine that the captured audio includes the keyword identified within the push notification, program instructions to analyze a context of the keyword included in the captured audio; and responsive to the program instructions to analyze the context of the keyword included in the captured audio, program instructions to determine whether to present the push notification based on the context of the keyword included in the captured audio; and program instructions to, responsive to determining not to present the push notification, prevent the push notification from being presented on the computing device.

16. The computer system of claim 15, wherein the program instruction to identify a keyword associated with the push notification based on the information comprise:

program instructions to determine an external resource associated with the information;
program instructions to analyze the external resource; and
program instructions to extract the keyword based on the analysis of the external resource.

17. The computer system of claim 15, wherein the captured audio comprises audio captured within a pre-defined period of time prior to the program instruction to receive the push notification.

18. The computer system of claim 15, wherein the program instructions to determine that the captured audio includes the keyword comprise:

program instructions to convert the captured audio to text;
program instructions to search the text for the keyword; and
program instructions to determine that the text includes the keyword, based on the search.

19. The computer system of claim 15, further comprising:

program instructions, stored on the one or more computer readable storage media for execution by at least one of the one or more processors, to assign a confidence level to the keyword, wherein the confidence level indicates a likelihood that audio containing the keyword correlates to the information in the push notification.

20. The computer system of claim 15, wherein the pre-determined time period is a sporting event.

* * * * *